United States Patent [19]
Sahori

[11] Patent Number: 5,422,479
[45] Date of Patent: Jun. 6, 1995

[54] AN OPTICAL TYPE ENCODER FOR POSITION DETECTION

[75] Inventor: Daisuke Sahori, Yokohama, Japan

[73] Assignee: Canon Kabushiki Kaisha, Tokyo, Japan

[21] Appl. No.: 142,055

[22] Filed: Oct. 28, 1993

Related U.S. Application Data

[63] Continuation of Ser. No. 824,771, Jan. 23, 1992, abandoned.

[30] Foreign Application Priority Data

Jan. 25, 1991 [JP] Japan .................. 3-025403
Jan. 25, 1991 [JP] Japan .................. 3-025404

[51] Int. Cl.⁶ .............................................. G01D 5/34
[52] U.S. Cl. .................... 250/231.18; 250/237 G; 354/409
[58] Field of Search ............ 250/231.18, 231.16, 250/231.13, 237 G, 231.14, 561; 356/400, 401; 430/311, 312, 313, 314, 315, 5; 354/402–404, 408–409

[56] References Cited

U.S. PATENT DOCUMENTS

| | | | |
|---|---|---|---|
| 4,492,861 | 1/1985 | Kebschull et al. | 250/237 G |
| 4,633,224 | 12/1986 | Gipp et al. | 340/347 P |
| 4,672,201 | 6/1987 | Welker | 250/231 SE |
| 4,720,699 | 1/1988 | Smith | 340/347 P |
| 4,750,821 | 6/1988 | Yamamoto et al. | 350/429 |
| 4,945,231 | 7/1990 | Ohya et al. | 250/231.14 |
| 5,003,171 | 3/1991 | Paley | 250/231.14 |
| 5,017,514 | 5/1990 | Nishimoto | 437/229 |
| 5,235,181 | 8/1993 | Durana et al. | 250/231.18 |

FOREIGN PATENT DOCUMENTS 01343123 9/1991 Japan .

Primary Examiner—David C. Nelms
Assistant Examiner—Que T. Le
Attorney, Agent, or Firm—Fitzpatrick, Cella, Harper & Scinto

[57] ABSTRACT

An optical type encoder, which detects a light beam from a light source by a light receiver through a plurality of slit arrays of a gauge member provided to an object to be detected, and detects position information of the object to be detected by utilizing a signal from the receiver, is disclosed. The light receiver includes a plurality of sensors which are arranged in a direction parallel to a position detection direction and are capable of detecting the incident position of a light beam. The plurality of slit arrays of the gauge member are arranged in correspondence with the plurality of sensors, so that a plurality of slits of each slit array are aligned in the position detection direction. All the positional relationships between the corresponding slits in one slit array and the other slit array of the plurality of slit arrays are different from each other.

85 Claims, 6 Drawing Sheets

AN OPTICAL TYPE ENCODER FOR POSITION DETECTION

This application is a continuation of application Ser. No. 07/824,771 filed Jan. 23, 1992, now abandoned.

BACKGROUND OF THE INVENTION

Field of the Invention

The present invention relates to an optical type encoder and, more particularly to an optical type encoder used in, e.g., a lens barrel having a variable magnification system, which changes a focal length by moving a lens in a direction of the optical axis, and suitable for detection of the position of a lens relative to another lens or a camera main body. An optical type encoder of the present invention can be generally applied to all the devices, which require position detection.

Related Background Art

A lens barrel having a variable magnification system, which performs focusing or changes a focal length by moving a lens in a direction of the optical axis, conventionally employs, as a method of controlling the moving amount of the lens, the position of a lens relative to a camera body, and the like, a method of driving a lens by rotating a cam ring based on a slidable movement between the cam ring provided in the lens barrel and having a cam groove, and a guide pin attached to a lens frame, and controlling the relative position and the moving amount according to the arrangement of the cam groove.

As another method, a method, wherein power sources for driving lenses, i.e., driving lens frames holding the lenses are provided in correspondence with the lenses to compensate for a short power output state caused by an increase in the number of lens units, is employed in place of the method of driving the lens by the cam ring to perform position control.

In the conventional method utilizing the cam ring and the guide pin, the driving operation and the control operation of the relative position for the lens are attained only by rotation of the cam ring. With this method, when the number of lens groups to be controlled is increased, the number of cam grooves to be formed in the cam ring is increased. For this reason, the mechanical strength of the cam ring as a whole is decreased, and the driving force must be increased so as to smoothly drive all the lens groups.

In the method wherein the power sources such as motors are arranged in a lens barrel at the lens side, a detection device for performing position control, e.g., an encoder, must be provided to each lens. The detection device is required to be compact enough to be equipped in a lens barrel, to be of a non-contact type so as not to interfere with a driving force from a power source, and to be able to precisely detect a target position.

Of encoders, increment type encoders such as an optical type encoder, an electromagnetic type encoder, and the like, each of which employs a constant-pitch pulse plate, must consider position detection in terms of the presence/absence of pulses, and cannot detect a position as an absolute amount. In contrast to this, although absolute type encoders can detect the absolute amount of a position, the information amount to be processed is undesirably increased.

The present applicant proposed, in Japanese Patent Application No. 1-343123, a compact, high-performance optical type encoder, which can absolutely detect position information of an object to be detected (lens frame) by utilizing a plurality of semiconductor position detection sensors (to be referred to as "PSDs" hereinafter) capable of detecting an incident position (barycentric position) of a light beam, and a gauge member having slit-like indices arranged at irregular intervals.

SUMMARY OF THE INVENTION

It is an object of the present invention to provide a compact optical type encoder, which can precisely detect the absolute position of an object to be detected in a non-contact manner.

It is another object of the present invention to provide an optical type encoder, which can improve linearity of a detected amount.

It is still another object of the present invention to provide an optical type encoder, which detects a light beam from light-emitting means by light-receiving means through a plurality of slit-like index arrays of a gauge member arranged in association with an object to be detected so as to detect position information of the object to be detected by utilizing a signal from the light-receiving means, wherein the light-receiving means includes a plurality of sensors arranged in a position detection direction and capable of detecting an incident position of a light beam, and the plurality of index arrays of the gauge member are arranged in correspondence with the plurality of sensors, so that a plurality of indices of each index array are aligned in the position detection direction, and all the positional relationships between corresponding indices in one index array and the other index array of the plurality of index arrays are different from each other.

DESCRIPTION OF THE PREFERRED EMBODIMENTS

Figure 1:
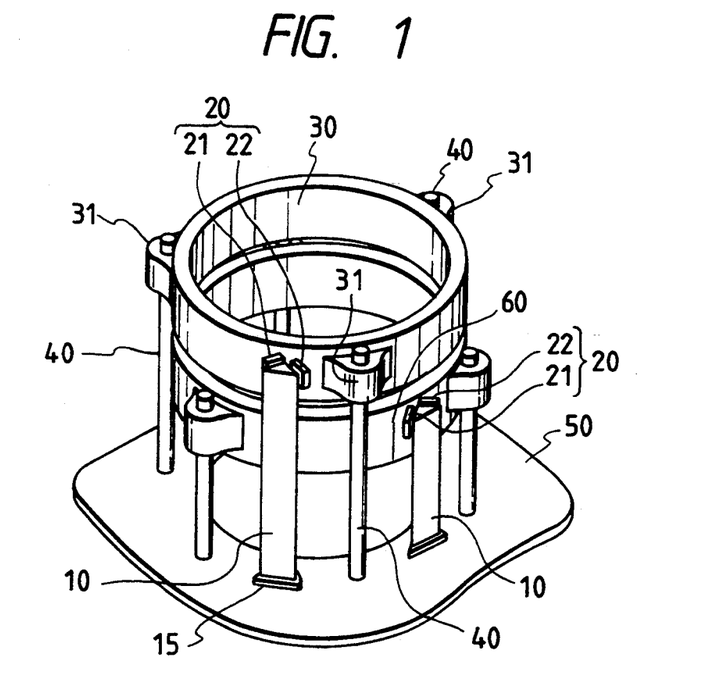
FIG. 1 is a perspective view showing principal part of the first embodiment wherein the present invention is applied to a lens barrel of a camera.

An embodiment wherein the present invention is applied to a lens barrel of a camera will be described below with reference to FIG. 1. In FIG. 1, an illustration of the overall camera main body, a housing of the lens barrel, and lenses are omitted.

In FIG. 1, each of gauge members 10 has a multi-slit member 1i (to be described later), and is fixed to a portion of a camera main body 50. Each of light projecting-/receiving members 20 has a light projector 21 and a light receiver 22. The light projecting/receiving members 20 are fixed to a lens frame 30. In this embodiment, the gauge member 10 and the light projecting/receiving member 20 constitute one element of an optical type encoder.

Bushings 31, formed integrally with the lens frame 30, are movable by slidable movement with a plurality of support rods 40. In this embodiment, a power unit such as motors, gear trains, and the like is not illustrated. The support rods 40 are fixed to the camera main body 50. A lens frame 60 has the same structure as the lens frame 30. In view of the overall structure of a camera, the lens frame 30 corresponds to a holding section of a front lens unit, and the lens frame 60 corresponds to that of a rear lens unit. These frames are reciprocally moved along the direction of the optical axis to attain a variable magnification function, and a focusing function. In this case, the intervals between the lens frames 30 and 60, and the camera main body 50 are measured in a non-contact manner using optical type encoders each having the light projecting/receiving member 20 and the gauge member 10. Note that the front and rear lens units are simultaneously moved to have a differential relationship therebetween so as to attain a zooming function, and the front lens unit is solely moved to attain a focusing function.

The structures of the respective elements will be described below with reference to FIGS. 2 to 4B.

Figure 2:
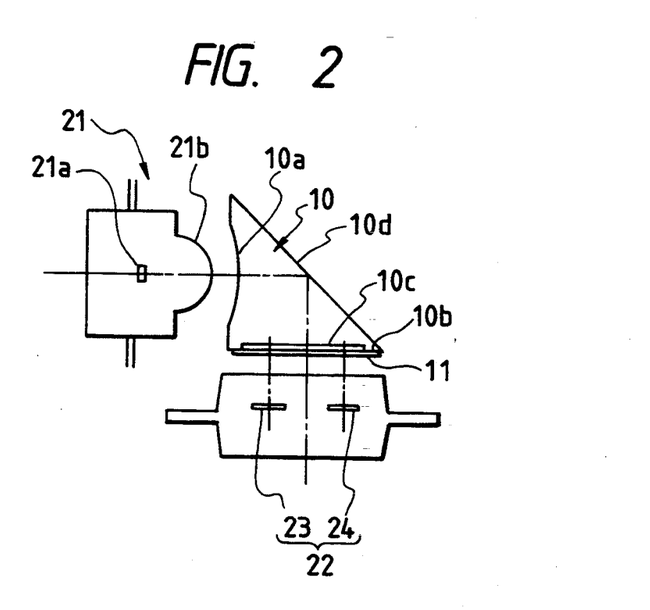
FIG. 2 is a partial view of the structure shown in FIG. 1.
Figure 3:
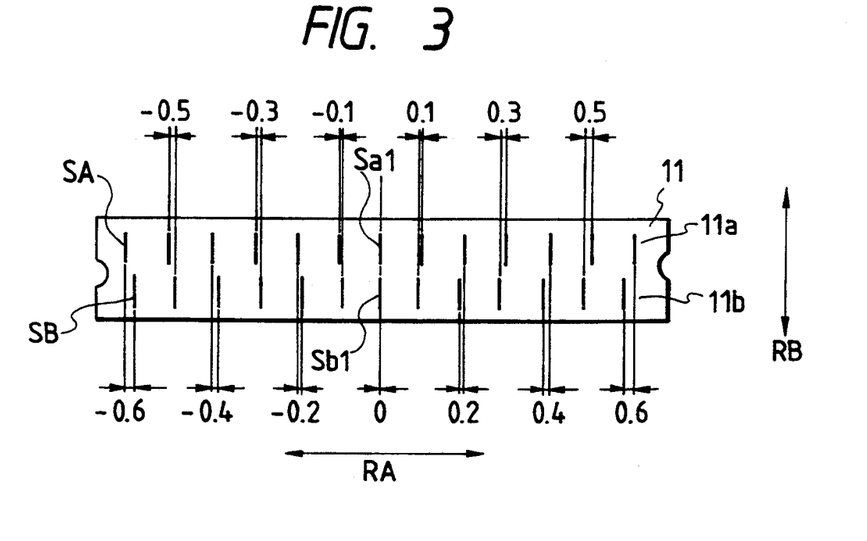
FIG. 3 is a view showing in detail constituting members in FIG. 1.

The gauge member 10 comprises a prism, which is formed of a transparent polycarbonate resin, and has a triangular-prism-like shape, so that an incident light beam is totally reflected therein. A surface 10a of the gauge member 10, which opposes the light projector 21 is defined by a cylindrical concave surface having a refracting power in a direction perpendicular to the position detection direction. Thus, a variation in arrangement of the light projector 21 is optically absorbed.

The slit plate 11 is adhered and fixed to a surface 10b of the gauge member 10, which opposes the light receiver 22, as shown in FIG. 2. Two slit arrays 11a and 11b are formed in the slit plate 11 to be parallel to a position detection direction RA, as shown in FIG. 3. Slits Sa and Sb of the two slit arrays 11a and 11b have different positional relationships therebetween. Of these slit arrays, the slit array 11a has slit openings formed at equal intervals, and the slit array 11b has slit openings formed at intervals different from the intervals of the slit openings of the slit array 11a.

A recess 10c wider than the width of the slits is formed in the surface (exit surface) 10b, opposing the slit arrays 11a and 11b, of the gauge member 10, so as to prevent portions, corresponding to the slit arrays, of the gauge member 10 from becoming opaque due to an excessive adhesive. The light projector 21 has an infrared light-emitting diode (to be referred to as an "IRED" hereinafter) 21a. The light projector 21 focuses a light beam emitted from the IRED 21a by a focusing section 21b and causes it to become incident on the surface 10a, defined by the concave surface, of the gauge member 10. The light receiver 22 has two sensors 23 and 24 such as PSDs, capable of detecting the incident position of a light beam. These sensors are arranged in a direction parallel to the position detection direction RA. Note that the sensor may comprise, e.g., a CCD.

A light beam emitted from the IRED 21a is incident on the surface 10a of the gauge member 10, is totally reflected by an inclined surface 10d, and is then incident on the slit arrays 11a and 11b through the recess 10c and the surface 10b. Light beam components passing through the slits of the slit arrays 11a and 11b are incident on the sensors 23 and 24. The coordinate positions, on the surfaces of the sensors 23 and 24, of the light beam components incident on the sensors 23 and 24 are detected to detect the positional relationship between the gauge member 10 and the light projecting/receiving member 20, i.e., the positional relationship between the camera main body 50 and the lens frame 30 (or 60).

The two slit arrays 11a and 11b formed in the slit plate 11 of this embodiment will be described below with reference to FIG. 3.

The two slit arrays 11a and 11b of the slit plate 11 are arranged in a direction parallel to the position detection direction RA. FIG. 3 exemplifies a case wherein a total of 13 slits SA (or SB) are formed on each of the slit arrays 11a and 11b for the sake of simplicity. Two central slits Sa1 and Sb1 shown in FIG. 3 are located on a straight line in a direction RB perpendicular to the position detection direction RA.

Since the slits of the slit array 11a are formed at equal intervals, intervals between adjacent slits in the position detection direction RA are constant. In contrast to this, the slits of the slit array 11b are formed at intervals different from the intervals of the slit openings of the slit array 11a, and the slit intervals are decreased by a predetermined amount (e.g., 0.1 mm) in the position detection direction RA. (Note that the slit intervals may be increased by a predetermined amount.)

In this case, a maximum shift amount between the slits of the slit arrays 11a and 11b is set to be ½ or less an effective range of the sensor 24 in the position detection direction RA. The position of the slit array 11a corresponds to a step position of the lens frame 30 (or 60) in a zooming mode.

Figure 4A:
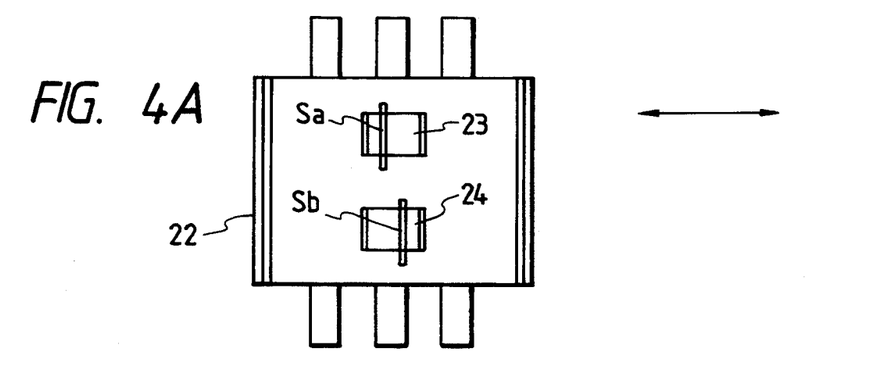
FIGS. 4A and 4B are explanatory views of operations of the constituting members.
Figure 4B:
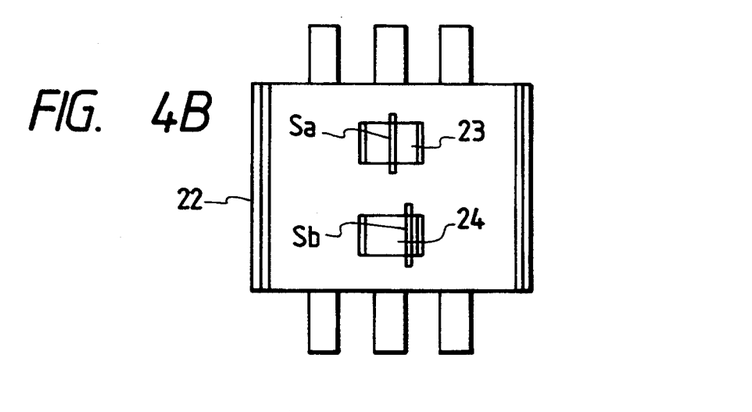

FIGS. 4A and 4B show the relationship between the two sensors 23 and 24, and the slits Sa and Sb of the slit arrays 11a and 11b. For example, as shown in FIG. 4A, when a light beam passing through a given slit Sa of the slit array 11a is incident on the left side of the sensor 23, the incident position on the surface of the sensor 23 is calculated by an arithmetic circuit (to be described later), and a moving amount necessary for moving the light beam to the center of the surface of the sensor 23 is also calculated. An actuator is then driven, so that the light beam is located at substantially the center of the sensor 23.

At this time, since a corresponding slit Sb is shifted to the right by a predetermined amount from the slit Sa, a light beam passing through the slit Sb is incident on a portion offset from the center to the right on the sensor 24. The interval between the slits Sa and Sb of the slit arrays 11a and 11b in the position detection direction RA is then calculated based on a shift amount between the positions of the incident light beam on the surfaces of the sensors 24 and 23.

As shown in FIG. 3, since the slits of the slit arrays 11a and 11b have different intervals therebetween in the position detection direction RA, the position of the light projecting/receiving member 20 with respect to the gauge member 10, i.e., the absolute position, can be obtained based on the intervals.

When a light beam passing through a slit Sa of the slit array 11a is incident on the right side of the sensor 23, the actuator is driven, so that the incident position of the light beam is located at the center of the sensor 23 in the same manner as described above. Based on the incident position of a light beam passing through a corresponding slit Sb of the slit array 11b on the sensor 23 at this time, the interval between the slits Sa and Sb of the slit arrays 11a and 11b in the position detection direction RA is calculated. Thus, the positional relationship between the light projecting/receiving member 20 and the gauge member 10 is detected.

Figure 5:
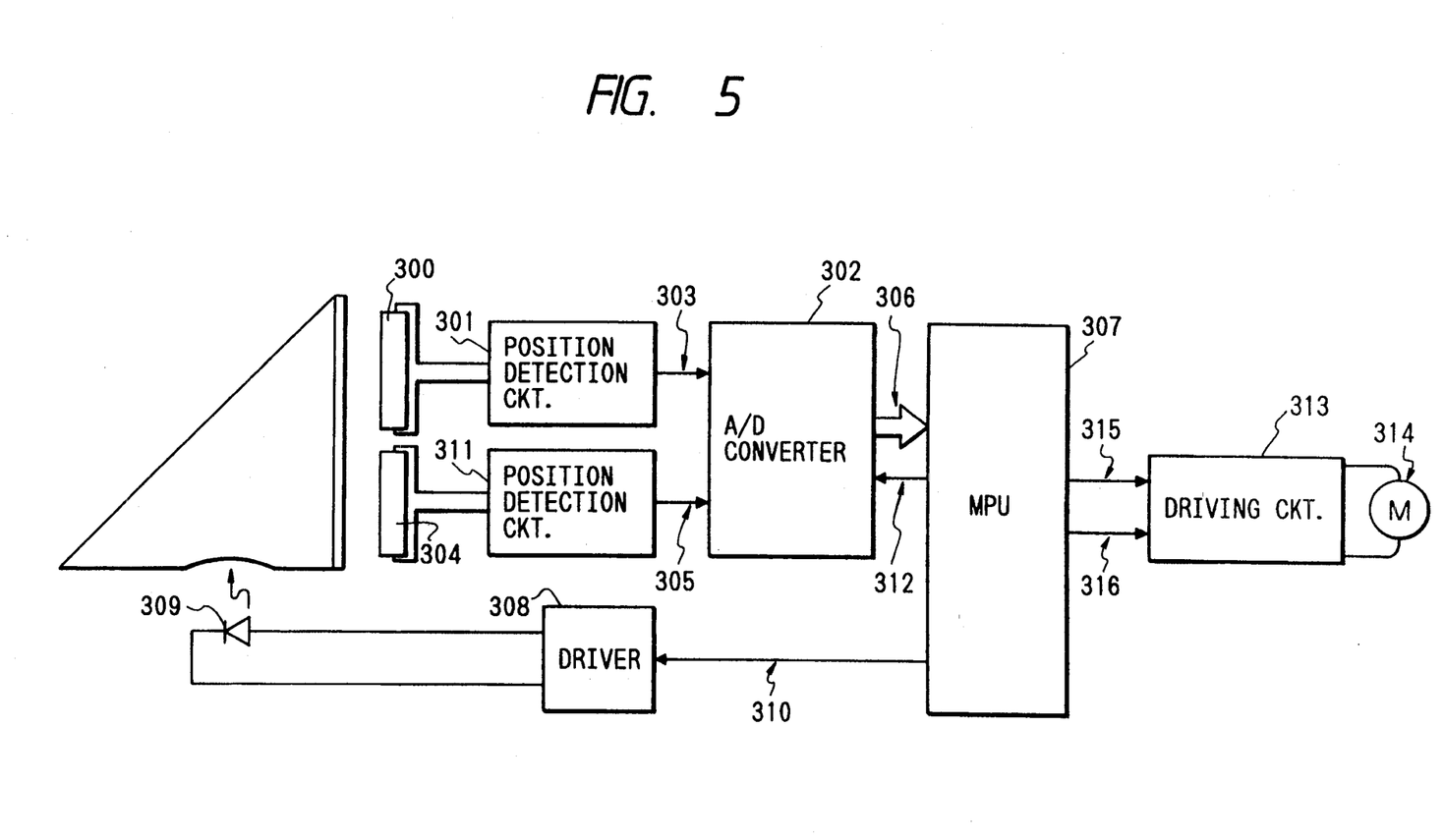
FIG. 5 is a block diagram of an electrical circuit system of the first embodiment of the present invention.

FIG. 5 is a block diagram showing a control unit and a detection unit. In FIG. 5, PSDs 300 and 304 correspond to the sensors 23 and 24 shown in FIG. 2. The common electrodes of these PSDs are connected to a constant voltage source (not shown), and the position detection electrodes thereof are respectively connected to position detection circuits 301 and 311. The position detection circuits 301 and 311 have the same arrangement, and output the barycentric positions of light incident on the PSDs 300 and 304 as analog voltage amounts onto lines 303 and 305.

Each of the position detection circuits 301 and 311 calculates the sum and difference of photovoltaic currents I and IB output from two position detection electrodes A and B of the corresponding PSD, logarithmically compresses the sum and the difference by diodes to calculate the difference therebetween, and then expands the difference to output an analog voltage corresponding to $(I_A - I_B)/(I_A + I_B)$. The analog value corresponding to $(I_A - I_B)/(I_A + I_B)$ corresponds to the barycentric position of a light beam incident on the PSD according to the characteristics of the PSD.

An A/D converter 302 has two inputs. The A/D converter 302 converts analog voltage amounts from the position detection circuits 301 and 311 into a digital value, and supplies data to a microcomputer (MPU) 307 through a bus 306. The A/D converter 302 also controls selection of inputs, conversion start timings, and the like according to a control signal 312 from the MPU 307.

An infrared light-emitting diode (IRED) 309 corresponds to the IRED 21a, and is driven by a driver 308. The driver 308 is controlled by a control signal 310 from the MPU 307.

A motor 314 moves the lens frame 30, and is driven by a driving circuit 313. The driving circuit 313 has a transistor bridge circuit, and is controlled by control signals 315 and 316 from the MPU 307. When the control signal 315 is at "H" level and the control signal 316 is at "L" level, the driving circuit 313 rotates the motor in the forward direction; when the control signal 315 is at "L" level and the control signal 316 is at "H" level, it rotates the motor in the reverse direction. When both the control signals are at "L" level, the driving circuit 313 stops the motor.

Figure 6:
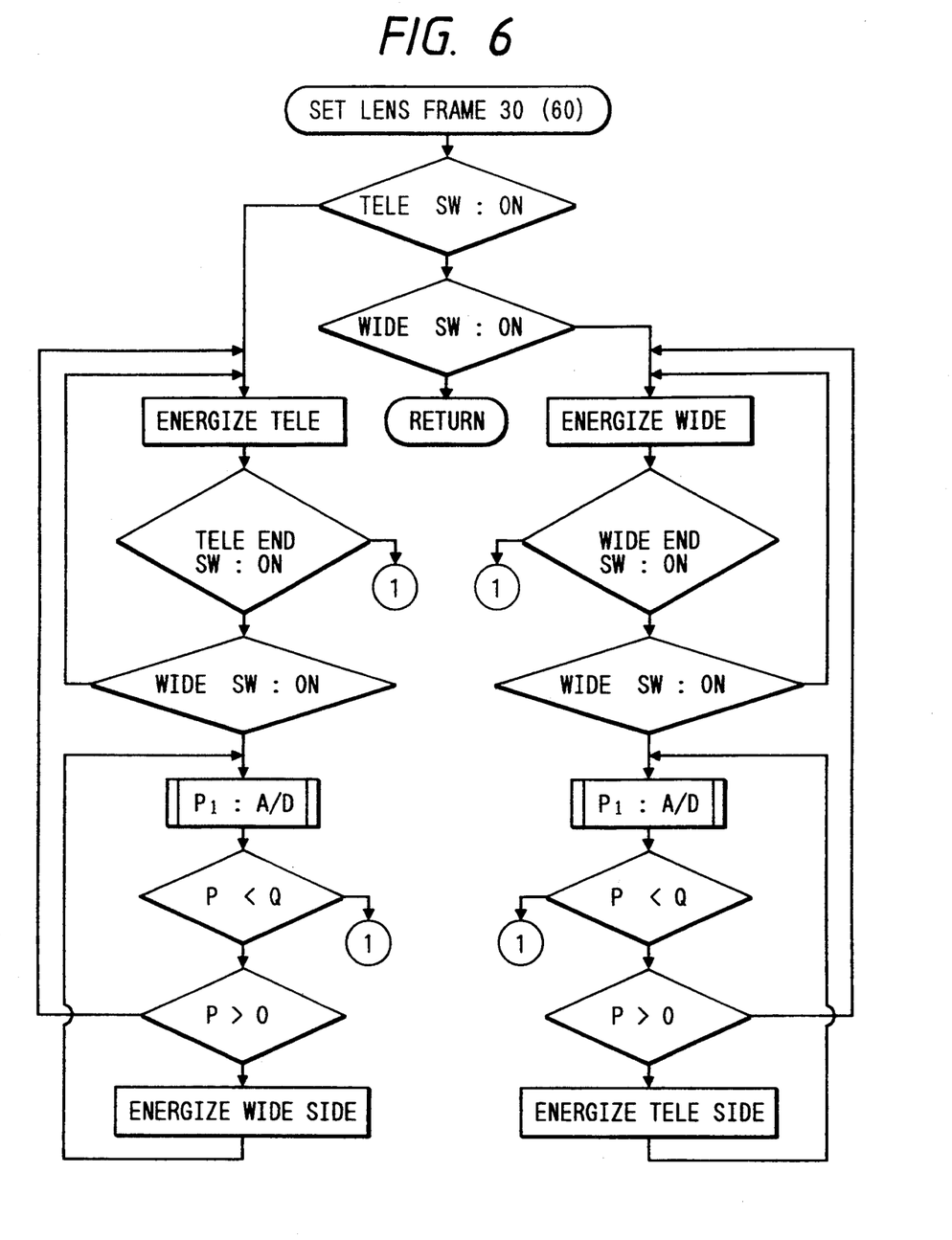
FIG. 6 is a flow chart of the first embodiment of the present invention.
Figure 7:
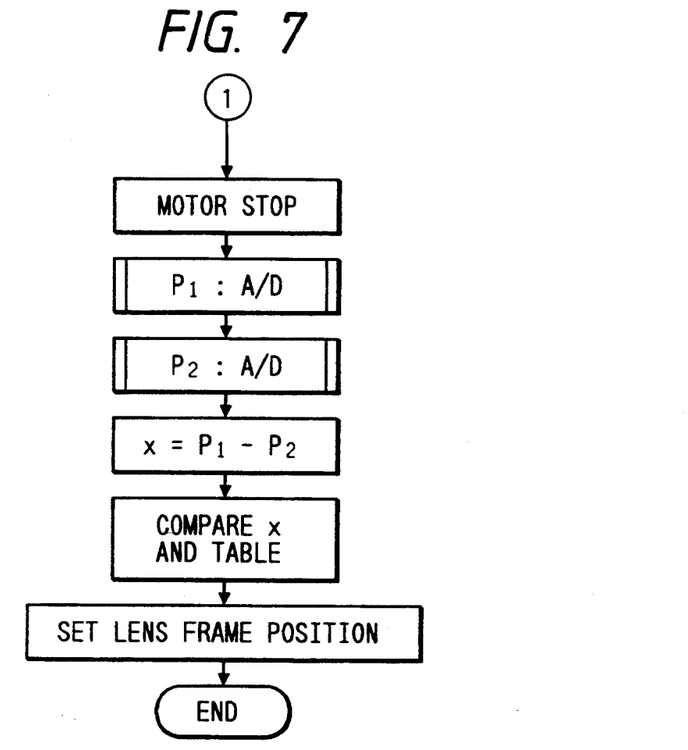
FIG. 7 is a flow chart of the first embodiment of the present invention.

FIGS. 6 and 7 are flow charts showing a sequence when the lens frame 30 is stopped at a predetermined position by a zooming operation in this embodiment. In this embodiment, the position of the lens frame 30 is stopped at one of several zoom positions according to the focal length. A case will be described below wherein a TELE SW is turned on, and the motor is energized toward the TELE side.

When the TELE SW is turned off, the motor is immediately stopped. Otherwise, the zooming operation is performed toward the TELE end. When the TELE SW is turned off, the stop position of the lens frame is read by the gauge member 10 and the light projecting/receiving member 20 described above. More specifically, whether or not a light beam passing through the slit array 11a of the gauge member 10 is incident on substantially the center of the sensor 23 is determined by checking if $|P| < Q$ by calculating:

$$|P| = \left| \frac{I_A - I_B}{I_A + I_B} \right|$$

where Q is the shift amount from the design value of a predetermined zoom position. When the value Q falls within an allowable range, it corresponds to the value $|P|$.

If $|P| < Q$, it is determined that the lens frame 30 is stopped at the predetermined position, and the motor is stopped. If $|P| \leq Q$, it is checked if the value P is positive or negative. If $|P| > 0$, the motor is energized toward the TELE side; if $|P| < 0$, the motor is energized toward the WIDE side. In this manner, the motor is energized until $|P| < Q$ is satisfied. If $|P| = 0$, since $|P| = 0 < Q$, energization to the motor is stopped, as a matter of course.

A case will be described below wherein a WIDE SW is turned on.

When the WIDE SW is turned on, the motor is energized toward the WIDE side. When the WIDE SW is turned off, the motor is stopped if $|P| < Q$ in the same manner as in the case wherein the TELE SW is turned off. If $|P| Q$ and $|P| > 0$, the motor is energized toward the WIDE side; if $|P| < 0$, the motor is energized toward the TELE side. The motor is stopped when $|P| < Q$.

After the lens frame 30 is stopped at a predetermined position in this manner, the position detection circuits 301 and 311 perform calculations based on pieces of position information from the PSDs 300 and 304. The calculation results are A/D-converted to digital data by the A/D converter 302. The digital data is supplied to the MPU 307 through the bus 306, thus obtaining x. The value x at this time represents the position of the lens frame 30 in a step zoom mode. The position of the lens frame 60 in the step zoom mode is determined in the same manner as described above.

In this manner, the zoom position is determined by the TELE or WIDE SW, and the positions of the lenses held by the lens frames 30 and 60 relative to the camera main body 50 are determined. Table 1 below shows the relationship between values x and zoom positions.

TABLE 1

| x | Zoom Position |
| --- | --- |
| −0.6 | 1 |
| −0.5 | 2 |
| −0.4 | 3 |
| −0.3 | 4 |
| −0.2 | 5 |
| −0.1 | 6 |
| 0 | 7 |
| 0.1 | 8 |
| 0.2 | 9 |
| 0.3 | 10 |
| 0.4 | 11 |
| 0.5 | 12 |
| 0.6 | 13 |

In this embodiment, the light projecting/receiving members 20 are provided to the lens frames 30 and 60, and the gauge members 10 are arranged in correspondence with the members 20. In this case, a common gauge member 10 may be used as long as these light projecting/receiving members 20 do not interfere with each other upon their movements.

In this embodiment, pieces of position information of the two lens frames 30 and 60 are detected. In addition, the present invention can be similarly applied to a case wherein pieces of position information of three or more lens frames are detected.

The present invention is not limited to the lens frames of the lens barrel, but may be similarly applied to all other devices for detecting position information of moving objects. The present invention is not limited to a linear encoder, but may be applied to a rotary encoder if the slits of the slit arrays are radially arranged. In place of the slits, slit-like reflecting portions may be used. In place of varying the slit intervals according to an arithmetic series, the slit intervals may be determined according to a geometric series.

Figure 8:
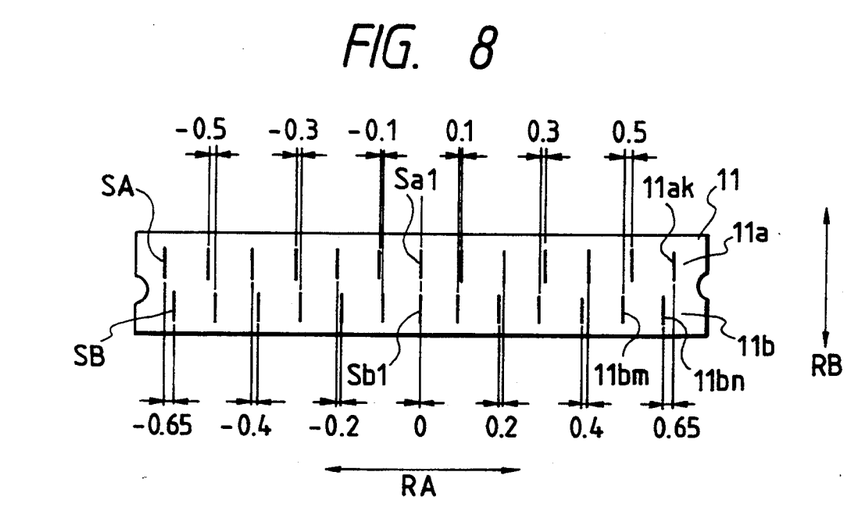
FIG. 8 is a view showing constituting members of the second embodiment of the present invention.

FIG. 8 shows the second embodiment of the present invention. In the second embodiment, a difference from the first embodiment will be described below.

In FIG. 8, only the interval between a last slit 11$bn$ at each of the two ends of a slit array 11$b$, and its neighboring slit 11$bm$ is decreased by an amount exceeding a predetermined amount (e.g., 0.15 mm), as compared to FIG. 3. (When other intervals are increased by a predetermined amount, only this interval is increased by an amount exceeding the predetermined amount.)

As a result, the interval between a last slit 11$ak$ of a slit array 11$a$ and the last slit 11$bn$ of the slit array 11$b$ in a position detection direction RA is not 0.6 but 0.65.

Figure 9:
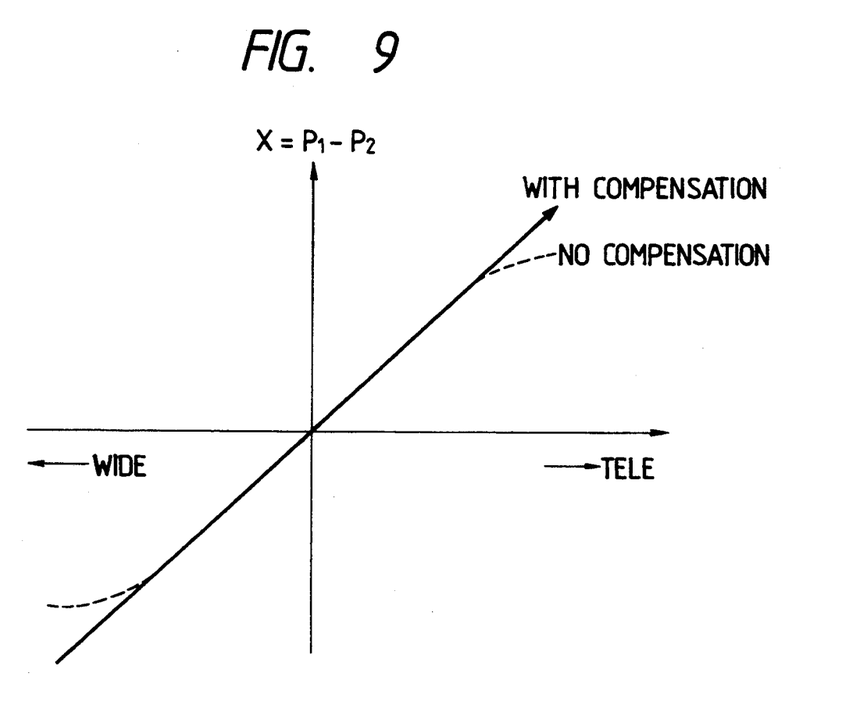
FIG. 9 is a chart showing the effect of the second embodiment.

In this embodiment, since slits Sb of the slit array 11$b$ are set in this manner, distortion (indicated by a dotted curve in FIG. 9) in linearity characteristics of a sensor (PSD) of the first embodiment can be compensated, as indicated by a solid line.

According to this embodiment, since the slit arrays of the slit plate, light-receiving means, and the like are set, as described above, the intervals between the slits of one of the two slit arrays are decreased (or increased) by a predetermined amount in a position detection direction, and the intervals at the two ends of the slit array are decreased (or increased) by an amount exceeding the predetermined amount, thus preventing nonlinear characteristics at the peripheral portion of the sensor (PSD), or widening a high-precision detection range.

The present invention is not limited to the above embodiments, and various modifications may be made.

What is claimed is:

1. An operation state determination apparatus detection means for detecting a moving state of an operation portion, said detection means including a plurality of detection portions disposed such that a relationship between said plurality of detection portions varies in a moving direction of said operation portion, wherein said detection means outputs a plurality of signals in accordance with said plurality of detection portions; and
    determination means for determining an absolute position of said operation portion in accordance with a relationship between said plurality of signals output by said detection means.

2. An operation state judgment apparatus according to claim 1, wherein said operation portion is provided with optical equipment.

3. An operation state judgment apparatus according to claim 1, wherein said operation portion is provided with a camera.

4. An operation state judgment apparatus according to claim 1, wherein said operation portion is provided with an optical system.

5. An operation state judgment apparatus according to claim 1, wherein said operation portion is provided with a lens system.

6. An operation state judgment apparatus according to claim 1, wherein said detection means includes means for detecting the moving position of said operation portion.

7. An operation state judgment apparatus according to claim 1, wherein said detection means includes means for detecting a relative moving position of said operation portion.

8. An operation state judgment apparatus according to claim 1, wherein said detection means includes a non-contact detection portion.

9. An operation state judgment apparatus according to claim 1, wherein said detection means includes an optical detection portion.

10. An operation state judgment apparatus according to claim 1, wherein said detection means includes a PSD.

11. An operation state judgment apparatus according to claim 1, wherein said detection means comprises:
    a first detection row in which a plurality of first detection portions are disposed in a moving direction of said operation portion; and
    a second detection row in which a plurality of second detection portions are disposed in a moving direction of said operation portion, whereby said moving position of said operation portion is detected by combining said second detection row with said first detection row.

12. An operation state judgment apparatus according to claim 11, wherein said detection means relatively detects a displaced direction of said plurality of second detection portions in said second detection row to said plurality of first detection portions in said first detection row.

13. An operation state judgment apparatus according to claim 12, wherein said detection means detects a displacement amount of said plurality of second detection portions in said second detection row to said plurality of first detection portions in said first detection row.

14. An operation state judgment apparatus according to claim 11, wherein said detection means detects a displacement amount of said plurality of second detection portions in said second detection row to said plurality of first detection portions in said first detection row.

15. An operation state judgment apparatus according to claim 1, wherein said detection means includes a sensor for outputting a signal responding to a moving state of said operation portion as an analog signal.

16. An operation state judgment apparatus according to claim 1, wherein said operation portion includes optical equipment.

17. An operation state judgment apparatus according to claim 1, wherein said detection means includes means for detecting a linear moving state of said operation portion.

18. An operation state judgment apparatus according to claim 1, wherein said detection means includes means for detecting a rotational moving state of said operation portion.

19. An operation state judgment apparatus according to claim 1, wherein said operation portion includes a power-variable optical element.

20. An operation state judgment apparatus according to claim 1, wherein said operation portion includes a focal point adjusting optical element.

21. An operation state judgment apparatus according to claim 11, further comprising drive means for driving said operation portion in response to said judgment means.

22. An operation state judgment apparatus according to claim 21, wherein said drive means includes a motor.

23. An operation state judgment apparatus according to claim 1, wherein said detection means includes a positional detection sensor.

24. An operation state judgment apparatus according to claim 11, wherein said detection means includes a plurality of detection portions disposed in a moving direction of said operation portion in which said plurality of detection portions are disposed at different intervals.

25. An operation state judgment apparatus according to claim 11, wherein said detection means is constructed to output signals having different intervals of signal generating positions as said plurality of signals responding to a moving position of said operation portion.

26. An operation state judgment apparatus according to claim 25, wherein said detection means is constructed to output signals having different signal generating positional directions as said plurality of signals responding to a moving position of said operation portion.

27. An operation state judgment apparatus according to claim 25, wherein said detection means is constructed to output signals having a peculiar signal generating positional interval as said plurality of signals responding to a moving terminal position of said operation portion.

28. An operation state judgment apparatus according to claim 11, wherein said detection means includes signal generating means for outputting signals having different signal generating positional intervals as said plurality of signals responding to a moving position of said operation portion.

29. An operation state judgment apparatus according to claim 1, wherein said detection means includes signal generating means for outputting signals having different signal generating positional directions as said plurality of signals responding to a moving position of said operation portion.

30. An operation state judgment apparatus according to claim 28, wherein said detection means includes signal generating means for outputting signals having a peculiar signal generating positional interval as said plurality of signals responding to a moving position of said operation portion.

31. An operation state judgment apparatus according to claim 11, wherein said detection means includes a plurality of detection portions for outputting signals having different signal generating positional intervals as said plurality of signals responding to a moving position of said operation portion.

32. An operation state judgment apparatus according to claim 31, wherein said detection means includes a plurality of detection portions for outputting signals having different signal generating positional directions as said plurality of signals responding to a moving position of said operation portion.

33. An operation state judgment apparatus according to claim 31, wherein said detection means includes a plurality of detecting portions for outputting signals having a peculiar signal generating positional interval as said plurality of signals responding to a moving position of said operation portion.

34. An operation state judgment apparatus according to claim 1, wherein said detection means includes means for outputting a peculiar signal responding to a moving terminal position of said operation portion.

35. An operation state judgment apparatus according to claim 1, further comprising control means for controlling a moving state of said operation portion in response to a single signal generated from said detection means.

36. An operation state judgment apparatus according to claim 35, wherein said judgment means includes means for employing a motion after control by using said control means.

37. An operation state judgment apparatus according to claim 1, further comprising control means for controlling a motion stop position of said operation portion in response to a single signal generating from said detection means.

38. An operation state judgment apparatus according to claim 37, wherein said judgment means includes means for employing a motion after control by using said control means.

39. An operation state judgment apparatus according to claim 1, further comprising control means for controlling state of motion of said operation portion in response to a signal generated from said detection means.

40. An operation state judgment apparatus according to claim 39, wherein said judgment means includes means for employing a motion after control by using said control means.

41. An operation state judgment apparatus according to claim 1, further comprising control means for controlling motion of a stop position of said operation portion in response to a signal generated from said detection means.

42. An operation state judgment apparatus according to claim 41, wherein said judgment means includes means for employing a motion after control by using said control means 43. An optical device comprising:
   detection means for detecting a moving state of an operation portion, said detection means including a plurality of detection portions disposed such that a relationship between said plurality of detection portions varies in a moving direction of said operation portion, wherein said detection means outputs a plurality of signals in accordance with said plurality of detection portions; and
   determination means for determining an absolute position of said operation portion in accordance with a relationship between said signals output by said detection means.

44. An optical device according to claim 43, wherein said operation portion is provided with a camera.

45. An optical device according to claim 43, wherein said operation portion is provided with an optical system.

46. An optical device according to claim 43, wherein said operation portion is provided with a lens system.

47. An optical device according to claim 43, wherein said detection means includes means for detecting a moving position of said operation portion.

48. An optical device according to claim 43, wherein said detection means includes means for detecting a relative moving position of said operation portion.

49. An optical device according to claim 43, wherein said detection means includes a non-contact detection portion.

50. An optical device according to claim 43, wherein said detection means includes an optical detection portion.

51. An optical device according to claim 43, wherein said detection means includes a PSD.

52. An optical device according to claim 43, wherein said detection means comprises:
a first detection row in which a plurality of first detection portions are disposed in a moving direction of said operation portion; and
a second detection row in which a plurality of second detection portions are disposed in a moving direction of said operation portion, whereby said moving position of said operation portion is detected by combining said second detection row with said first detection row.

53. An optical device according to claim 52, wherein said detection means relatively detects a displaced direction of said plurality of second detection portions in said second detection row to said plurality of first detection portions in said first detection row.

54. An optical device according to claim 53, wherein said detection means detects a displacement amount of said plurality of second detection portions in said second detection row to said plurality of first detection portions in said first detection row.

55. An optical device according to claim 52, wherein said detection means detects a displacement amount of said plurality of second detection portions in said second detection row to said plurality of first detection portions in said first detection row.

56. An optical device according to claim 43, wherein said detection means includes a sensor for outputting a signal responding to a moving state of said operation portion as an analog signal.

57. An optical device according to claim 43, wherein said operation portion includes optical equipment.

58. An optical device according to claim 43, wherein said detection means includes means for detecting a linear moving state of said operation portion.

59. An optical device according to claim 43, wherein said detection means includes means for detecting a rotational moving state of said operation portion.

60. An optical device according to claim 43, wherein said operation portion includes a power-variable optical element.

61. An optical device according to claim 43, wherein said operation portion includes a focal point adjusting optical element.

62. An optical device according to claim 43, further comprising drive means for driving said operation portion in response to said determination means.

63. An optical device according to claim 62, wherein said drive means includes a motor.

64. An optical device according to claim 43, wherein said detection means includes a positional detection sensor.

65. An optical device according to claim 43, wherein said detection means includes a plurality of detection portions disposed in a moving direction of said operation portion in which said plurality of detection portions are disposed at different intervals.

66. An optical device according to claim 43, wherein said detection means is constructed to output signals having different intervals of signal generating positions as said plurality of signals responding to a moving position of said operation portion.

67. An optical equipment according to claim 66, wherein said detection means is constructed to output signals having different signal generating positional directions as said plurality of signals responding to a moving position of said operation portion.

68. An optical equipment according to claim 66, wherein said detection means is constructed to output signals having a peculiar signal generating positional interval as said plurality of signals responding to a moving terminal position of said operation portion.

69. An optical equipment according to claim 43, wherein said detection means includes signal generating means for outputting signals having different signal generating positional intervals as said plurality of signals responding to a moving position of said operation portion.

70. An optical equipment according to claim 69, wherein said detection means includes signal generating means for outputting signals having different signal generating positional directions as said plurality of signals responding to a moving position of said operation portion.

71. An optical equipment according to claim 69, wherein said detection means includes signal generating means for outputting signals having a peculiar signal generating positional interval as said plurality of signals responding to a moving position of said operation portion.

72. An optical equipment according to claim 43, wherein said detection means includes a plurality of detection portions for outputting signals having different signal generating positional intervals as said plurality of signals responding to a moving position of said operation portion.

73. An optical equipment according to claim 72, wherein said detection means includes a plurality of detection portions for outputting signals having different signal generating positional directions as said plurality of signals responding to a moving position of said operation portion.

74. An optical equipment according to claim 72, wherein said detection means includes a plurality of detecting portions for outputting signals having a peculiar signal generating positional interval as said plurality of signals responding to a moving position of said operation portion.

75. An optical equipment according to claim 43, wherein said detection means includes means for outputting a peculiar signal responding to a moving terminal position of said operation portion.

76. An optical equipment according to claim 43, further comprising control means for controlling a moving state of said operation portion in response to a single signal generated from said detection means.

77. An optical equipment according to claim 76, wherein said determination means includes means for employing a motion after control by using said control means, 78. An optical equipment according to claim 43, further comprising control means for controlling a motion stop position of said operation portion in response to a single signal generating from said detection means.

79. An optical equipment according to claim 78, wherein said determination means includes means for employing a motion after control by using said control means.

80. An optical equipment according to claim 43, further comprising control means for controlling state of motion of said operation portion in response to a signal generated from said detection means.

81. An optical equipment according to claim 80, wherein said judgment means includes means for employing a motion after control by using said control means.

82. An optical equipment according to claim 43, further comprising control means for controlling a motion stop position of said operation portion in response to a signal generated from said detection means.

83. An optical equipment according to claim 82, wherein said judgment means includes means for employing a motion after control by using said control means.

84. An optical device comprising:

detection means for detecting a moving state of an operation portion, said detection means including a light source movable with said operation portion, a plurality of stationary detection portions disposed in a moving direction of said operation portion in which said plurality of detection portions are disposed at different intervals, and sensor means for detecting light from said light source, wherein said sensor means is movable with said operation portion, and wherein said detection means outputs a plurality of signals each corresponding to one of said detection portions, and wherein a difference between two of the plurality of signals corresponds to an interval between two of said detection portions; and determination means for determining an absolute position of said operation portion on the basis of the difference between at least two of the plurality of signals which said detection means outputs.

85. An operation state judgment apparatus, comprising:

detection means for detecting a moving state of an operation portion, said detection means including;

a stationary first detection row in which a plurality of first detection portions are at different intervals along a direction of movement of said operation portion;

a stationary second detection row in which a plurality of second detection portions are disposed at similar intervals along a direction of movement of said operation member, wherein said detection means outputs a first signal corresponding to one of said plurality of first detection portions of said first detection row and a second signal corresponding to one of said plurality of second detection portions of said second detection row, and wherein a difference between the first signal and the second signal corresponds to an interval between one of said plurality of first detection portions and one of said plurality of second detection portions; and determination means for determining an absolute position of said operation portion in accordance with a relationship between said signals which said detection means outputs.

* * * * *

UNITED STATES PATENT AND TRADEMARK OFFICE
CERTIFICATE OF CORRECTION

PATENT NO. : 5,422,479

DATED : June 6, 1995

INVENTOR : DAISUKE SAHORI

It is certified that errors appear in the above-identified patent and that said Letters Patent is hereby corrected as shown below: Title page:

[56] References Cited

U.S. Patent Documents, "5,017,514  5/1990  Nishimoto" should read --5,017,514  5/1991  Nishimoto--.

COLUMN 2

Line 68, "member 1;" should read --member 11--.

COLUMN 5

Line 24, "I and IB" should read --IA and IB--.

COLUMN 6

Line 30, "|P|Q" should read --$|P| \geq Q$--.

COLUMN 7

Line 50, "apparatus detec-" should read --apparatus comprising: ¶ detec- --.

COLUMN 9

Line 5, "claim 11," should read --claim 1,--;

Line 14, "claim 11," should read --claim 1,--;

Line 20, "claim 11," should read --claim 1,--;

Line 35, "claim 11," should read --claim 1,--; and

Line 54, "claim 11," should read --claim 1,--.

UNITED STATES PATENT AND TRADEMARK OFFICE
CERTIFICATE OF CORRECTION

PATENT NO. : 5,422,479

DATED : June 6, 1995

INVENTOR : DAISUKE SAHORI

It is certified that errors appear in the above-identified patent and that said Letters Patent is hereby corrected as shown below:

COLUMN 12

Line 3, "equipment" should read --device--;

Line 8, "equipment" should read --device--;

Line 13, "equipment" should read --device--;

Line 19, "equipment" should read --device--;

Line 25, "equipment" should read --device--;

Line 31, "equipment" should read --device--;

Line 37, "equipment" should read --device--;

Line 43, "equipment" should read --device--;

Line 49, "equipment" should read --device--;

Line 53, "equipment" should read --device--;

Line 57, "equipment" should read --device--; and

UNITED STATES PATENT AND TRADEMARK OFFICE
CERTIFICATE OF CORRECTION

PATENT NO. : 5,422,479

DATED : June 6, 1995

INVENTOR : DAISUKE SAHORI

It is certified that errors appear in the above-identified patent and that said Letters Patent is hereby corrected as shown below:

COLUMN 12, Cont'd.

Line 61, "equipment" should read --device--.

Signed and Sealed this

Seventh Day of November, 1995

Attest:

BRUCE LEHMAN

*Attesting Officer*    *Commissioner of Patents and Trademarks*